US011685099B2

(12) United States Patent
Soellner et al.

(10) Patent No.: US 11,685,099 B2
(45) Date of Patent: Jun. 27, 2023

(54) STERILIZABLE BLOWING AIR PATHS AND STRETCHING ROD OF A BLOW MOULDING MACHINE

(71) Applicant: KRONES AG, Neutraubling (DE)

(72) Inventors: Juergen Soellner, Beratzhausen (DE); Florian Geltinger, Donaustauf (DE); Kevin Werkmann, Alteglofsheim (DE)

(73) Assignee: KRONES AG

( * ) Notice: Subject to any disclaimer, the term of this patent is extended or adjusted under 35 U.S.C. 154(b) by 0 days.

(21) Appl. No.: 17/050,804

(22) PCT Filed: Apr. 25, 2019

(86) PCT No.: PCT/EP2019/060567
§ 371 (c)(1),
(2) Date: Oct. 26, 2020

(87) PCT Pub. No.: WO2019/207025
PCT Pub. Date: Oct. 31, 2019

(65) Prior Publication Data
US 2021/0122099 A1    Apr. 29, 2021

(30) Foreign Application Priority Data

Apr. 26, 2018    (DE) .................. 10 2018 110 036.1

(51) Int. Cl.
*B29C 49/46*    (2006.01)
*B29C 49/12*    (2006.01)

(52) U.S. Cl.
CPC .............. *B29C 49/46* (2013.01); *B29C 49/12* (2013.01); *B29C 2049/4611* (2013.01); *B29C 2049/4635* (2013.01); *B29C 2049/4697* (2013.01)

(58) Field of Classification Search
CPC ....... B67C 3/001; B67C 3/004; B67C 7/0073; B29C 49/46; B29C 2049/4635;
(Continued)

(56) References Cited

U.S. PATENT DOCUMENTS 5,562,129 A * 10/1996 Graffin .................. B67C 3/004
141/147
9,149,970 B2   10/2015 Martini et al. .......... B29C 49/42
(Continued)

FOREIGN PATENT DOCUMENTS

DE    10 2010 022 132    11/2011   ............. B29C 49/46
DE    10 2013 019 169     5/2015   ............. B29C 49/42
(Continued)

OTHER PUBLICATIONS

Machine translation of DE 102014216562 A1 dated Feb. 2016. (Year: 2016).*
(Continued)

*Primary Examiner* — Robert B Davis
(74) *Attorney, Agent, or Firm* — Hayes Soloway P.C.

(57) ABSTRACT

Apparatus for forming plastic preforms into plastic containers includes a transport device for transporting the plastic preforms, wherein the transport device has a movable carrier on which a plurality of forming stations are arranged, wherein the forming stations each form a cavity having forming moulds configured to receive plastic preforms which are formable into plastic containers within this cavity when acted upon by a flowable medium and expanded. The forming stations further includes an applicator which acts upon the plastic preforms with the flowable medium, and at least one connecting line configured to guide the flowable medium to the applicator. The apparatus also has a steril-
(Continued)

ization device, whereby at least a section of this connecting line can be at least temporarily pressurized with a sterilization medium.

7 Claims, 2 Drawing Sheets

(58) Field of Classification Search
CPC ......... B29C 49/4252; B29C 2049/4611; B29C 2049/4697; B29C 49/58
See application file for complete search history.

(56) References Cited

U.S. PATENT DOCUMENTS

| | | | |
|---|---|---|---|
| 9,289,939 B2 | 3/2016 | Brunner | B29C 49/46 |
| 10,286,590 B2 | 5/2019 | Niehr | B29C 49/46 |
| 2011/0011489 A1* | 1/2011 | Meinzinger | B67C 3/004 |
| | | | 141/1 |
| 2014/0091499 A1* | 4/2014 | Brunner | B29C 49/46 |
| | | | 264/523 |
| 2016/0107366 A1* | 4/2016 | Gillet | B29C 49/46 |
| | | | 134/22.12 |
| 2016/0167257 A1* | 6/2016 | Chauvin | B29C 49/46 |
| | | | 134/22.1 |
| 2016/0324998 A1 | 11/2016 | Reed et al. | A61L 2/20 |
| 2017/0197352 A1 | 7/2017 | Litzenberg et al. | B29C 49/4273 |

FOREIGN PATENT DOCUMENTS

| | | | |
|---|---|---|---|
| DE | 102014216562 A1 * | 2/2016 | B29C 49/46 |
| EP | 2 388 126 | 11/2011 | B29C 49/42 |
| EP | 2 692 506 | 2/2014 | B29C 49/36 |
| EP | 2 987 732 | 2/2016 | B65B 3/02 |

OTHER PUBLICATIONS

German Search Report issued in German Patent Appln. Serial No. 10 2018 110 036.1, dated Feb. 21, 2019, with machine english translation, 11 pages.

International Search Report and Written Opinion issued in PCT/EP2019/060567, dated Jul. 15, 2019, with English translation, 15 pages.

International Preliminary Report on Patentability issued in PCT/EP2019/060567, dated Oct. 27, 2020, 6 pages.

* cited by examiner

STERILIZABLE BLOWING AIR PATHS AND STRETCHING ROD OF A BLOW MOULDING MACHINE

BACKGROUND OF THE INVENTION

The present invention relates to an apparatus for forming plastic preforms into plastic containers, whereby only selected partial areas are exposed to a sterilization medium.

In the applicants internal prior art, various apparatus with a sterilization device are known. It is known, for example, that there are apparatus which meet the highest requirements of sterilization. In order to meet these requirements, almost all elements of such apparatus are subjected to sterilization. It is also known that such apparatus can be arranged within a clean room. Such apparatus have the disadvantage that they are very cost-intensive, both in production and in operation.

In addition to these highly sterile apparatus, the applicant's internal prior art also includes apparatus that operate with a much lower sterilization rate. For example, only a plastic preform is sterilized. Since the remaining areas of the plant which may come into contact with the sterilized plastic preform are not sterilized or are not sterile, there is an increased risk of recontamination.

The object of the present invention is to overcome the disadvantages of the known prior art. And to provide a less expensive apparatus which nevertheless features a sterilization device in which the risk of recontamination is significantly reduced and which also satisfies higher sterilization requirements, thereby distinguishing the proposed apparatus from the above-mentioned systems.

SUMMARY OF THE INVENTION

An apparatus according to the invention for forming plastic preforms into plastic containers has a transport means for transporting the plastic preforms. This transport means has a movable carrier on which a large number of forming stations are arranged. These forming stations each form a cavity and have forming moulds, whereby the forming stations are suitable and intended to receive the plastic preforms. The plastic preforms can be formed into plastic containers within the cavity of the forming stations by applying a flowable medium to the plastic preforms and expanding them. Furthermore, the forming stations have an application means, which applies the flowable medium to the plastic preforms, as well as at least one connecting line, which is intended to lead the flowable medium to the application means.

According to the invention, the apparatus has a sterilization device, whereby at least one section of this connecting line can beat least partially exposed to a sterilization medium.

Preferably, the sterilizing device is arranged centrally on the carrier and thus supplies the at least sections of the connecting lines with a sterilizing medium from time to time. However, it would also be conceivable, for example, that a sterilization device is assigned to each forming station.

In a preferred embodiment, the plastic preforms are exposed to a flowable medium such as blow air. This blow air is advantageously under a certain, predefined pressure. This pressurized blowing air can thus be fed into a plastic preform by means of the application means and, in particular, be introduced into its interior. By this admission, a plastic preform is expanded to a plastic container. Expanding is understood to be an expansion in radial and axial direction of the plastic preform. It is quite conceivable and imaginable that the plastic preforms are exposed to a liquid, for example a liquid to be filled, instead of blowing air and are thus expanded.

In addition to the application means, the apparatus has advantageously at least one stretching rod. This stretching od is preferably assigned to a forming station. Preferably, one stretching rod is assigned to each forming station. This stretching rod is preferably movable in a longitudinal direction of the plastic preforms. This stretching rod can be advantageously inserted into the plastic preforms via an opening, e.g. over their mouth area, so that the plastic preforms can be stretched in longitudinal direction in addition to being exposed to pressurized air.

In a preferred embodiment, the application means is designed as a blow nozzle. This blow nozzle can be placed preferably at an orifice or an orifice area of a plastic preform. It is advantageous that the application means, or the blowing nozzle can be placed at the mouth of a plastic preform in such a way that an airtight connection is created. This means that the blowing air which is introduced into the plastic preform under pressure only enters the plastic preform and cannot escape at a transition area between the application means and the plastic preform.

Preferably the above-mentioned carrier is a blowing wheel. This movable carrier or blowing wheel is preferably rotatable around a given axis of rotation. The forming stations are advantageously arranged on the carrier or the blowing wheel. These forming stations have, for example, a blow mould which provides or has the above-mentioned cavity for the plastic preforms or the plastic containers. Preferably, this blow mould is composed of two or more parts, preferably three parts, for example two side parts and a bottom part, whereby, if these preferably three parts are brought together, the above-mentioned cavity is created or formed inside them. These forming stations can advantageously perform an opening and closing movement to receive a plastic preform or to release a plastic container from the forming station. Thus, the carriers or the forming stations perform a pivoting movement, whereby they are swiveled open or closed. The preferred position is a swivel axis of this swivel movement parallel to a longitudinal direction of the plastic preforms to be expanded.

Preferably, the carrier, i.e. the blowing wheel or in general the forming station, is preceded by a heating means or the heating means is located upstream of the forming station. This means that preferably the plastic preforms, which are fed to the moving carrier, are first transported through a heating means and are thus preferably subjected to a temperature, whereby the plastic preforms heat up.

In an advantageous embodiment, for example, a filling means and/or a labeling means is connected downstream of the forming stations or is located downstream of the forming station as seen from the latter. By means of this filling means the finished formed plastic containers can be filled with a liquid, for example a beverage. Before or after, i.e. before the plastic containers have been filled with a liquid or after the plastic containers have been filled with a liquid, these plastic containers can still be provided with a label. There are various ways in which a label can be attached to a plastic container, which are sufficiently known to an expert.

In order to guarantee a certain degree of purity and to comply with the hygiene regulations, the apparatus has a sterilization device through which the apparatus can be exposed to a sterilization medium. It is also advantageous that the sterilization medium is a flowable medium. The sterilization medium is characterized, for example, by the fact that it can sterilize an object which is exposed to the flowable medium. Thus, the flowable medium with which the plastic preforms are exposed to be formed into plastic containers differs from the flowable medium used for sterilization. Preferably the flowable medium is a sterilization medium. In a preferred embodiment, the sterilization medium is a gas, especially a sterile gas or sterilization gas. Other sterilization media such as liquids cannot be excluded.

In a preferred embodiment, the forming station has a closing means for closing the application means. Preferably, the closing means has a movable and especially a swiveling closing element. By means of this movable and in particular swiveling closing element the application means can be closed during a sterilization process. It is possible, for example, that the closing element seals an application means or the blow nozzle in such a way that a sterilization medium cannot escape from it and, for example, does not get into the plastic preforms or plastic containers or into other areas of the apparatus. This sealing element can be designed as a cap, for example. However, other closing elements cannot be excluded.

In another preferred embodiment, at least some parts of the apparatus are made of materials that are resistant to sterilization media. For example, such areas can be made of stainless steel, Niro or aluminum. In addition, plastics such as PTFE or EPDM, which are also resistant to sterilization media, can also be used for these areas.

In a preferred embodiment, the apparatus has at least one valve, with which, for example, a flow path of the blow air and/or the sterilization medium is controlled. Preferably, one flow path of the blowing air and one flow path of the sterilization medium can be the same flow path. This means that the blast air and the sterilization medium are guided or conveyed within the same line. Preferably, these valves, which control the flow paths, can also be supplied with a sterilization medium and thus also be sterilized. However, different flow paths could also be provided in some cases.

Preferably the apparatus has a valve block with at least one, preferably several valves. At this valve block, for example, the application means is arranged. Also, a stretching rod can be moved within this valve block. It is advantageous that either only individual valves or all valves can be sterilized.

In a preferred embodiment, the sterilization device has at least one first supply line for supplying the sterilization medium to the individual areas of the device or the forming stations. In a preferred design, the sterilization device has at least one first discharge line for discharging the sterilization medium from the individual areas of the device or the forming stations. Thus, the sterilization medium is supplied via one line and discharged via another line.

In another preferred embodiment, the sterilization device has (at least and preferably exactly) two supply lines for supplying the sterilization medium and two discharge lines for discharging the sterilization medium. Thus, preferably two supply lines and two discharge lines are assigned to or arranged at each forming station.

Preferably, the supply lines for the sterilization medium are the same lines for supplying the pressurized blow air. Thus, the supply lines for the blow air are at the same time the supply lines for the sterilization medium. Likewise, the discharge lines for the blast air are also the discharge lines for the sterilization medium.

Preferably, the above-mentioned valves are arranged, for example, within these supply and discharge lines. By means of these valves within the supply and discharge lines, it is possible, for example, that the sterilization medium or the blow air is fed or conveyed within the supply lines at different pressure levels.

Preferably, these lines are made of materials selected from a group of materials that includes stainless steel, aluminum, PTFE and EPDM.

In a preferred embodiment, the apparatus has at least one sterile filter. Preferably the apparatus has several of these sterile filters. Preferably these sterile filters are arranged inside the lines, which conduct the blow air or the sterilization medium. In particular, these sterile filters are arranged within the supply lines of the blowing air or the sterilization medium.

Preferably at least one sterile filter per pressure stage is provided. Alternatively, at least one sterile filter per forming station is assigned, especially preferred are two sterile filters per forming station.

Preferably, at least one sterile filter is arranged in front of an annular channel and in particular an annular channel which is assigned to a certain pressure stage.

In another preferred embodiment, only the lines that convey the pressurized blowing air, the application means that introduces the pressurized blowing air into the plastic preforms and the stretching rod that stretches the plastic preforms in longitudinal direction are pressurized with the sterilization medium. Thus, for example, the cavity which is formed by the forming station and within which a plastic preform is expanded to a plastic container is not exposed to a sterilization medium.

Preferably, the lines, the application means, the stretching rod and the sterile filters are designed in such a way that they can be loaded with an $H_2O_2$ gas and/or peracetic acid gas during sterilization. The components of the apparatus which come into contact with the sterilization medium are therefore made of a material which is resistant to the sterilization medium. Other components which do not come into contact with the sterilization medium can be made of a different material. The components which come into contact with the sterilization medium can be made completely of such a resistant material, but it is also possible that only their surface is made of such a resistant material.

It is also preferable that only the surface which actually comes into contact with the sterilization medium is made of such a resistant material. It is sufficient, for example, that only the inner surface of the lines that carry/conduct the blow air and the sterilization medium is coated. A resistant material is generally understood to be materials that are not susceptible to oxidation, such as stainless steel.

Sterile filters are preferably used in each blast airline or in each supply line. To sterilize the sterile filters, the blow air paths, the application means and the stretching rod, the sterilization medium is fed, for example, via two supply lines to the application means, i.e. the blow nozzle. As described above, the blowing nozzle is closed with a closing element that can be swiveled inwards. This prevents the sterilization medium from escaping from the blowing nozzle. Thus, an area consisting of supply lines, sterile filter, valves within the supply lines, stretching rod and application means is sterilized.

The stretching rod can be sealed at the upper end (the counterpart to the lower end, whereby the lower end is this, which can be retracted into the plastic preform) in such a way that the entire stretching rod can be retracted into the valve block. Thus, in addition to the blow nozzle, the sterile filter and the blow air path, the stretching rod, at least the part that can be inserted into the plastic preform, can also be sterilized. Furthermore, this closure element can be used to create a kind of short circuit between the individual blow air paths, so that the incoming sterilization medium can be drained off again or removed via the two discharge lines, for example.

In a further embodiment it would be conceivable to do without the above-mentioned closure element. This would allow the sterilization medium to flow into the blow mould, i.e. into the cavity formed by the forming station, or to be introduced. The sterilization medium which then escapes at the blowing station or the forming station could then be sucked off by means of a ring-shaped suction device, for example.

In a further embodiment it would be conceivable that a switchable connection between the forming station and the stretching rod could be established. This would allow the sterilization medium to flow from the forming station to the stretching rod and thus subject it to sterilization. This switchable connection could for example be one of the above-mentioned discharge lines. For this purpose, however, it would be advantageous if the stretching rod were enclosed and connected at an upper end with, for example, a suction device so that the sterilization medium can be safely discharged. It would be conceivable that the suction unit would be arranged stationary on the movable carrier and connected to the standing suction unit by means of a movable docking device during a sterilization process.

In another preferred embodiment, the apparatus is located inside a clean room. This clean room can have the clean room class DIN EN 14644 or a comparable clean room class.

Due to the apparatus according to invention a clean room can be used, which has a relatively low purity class. This has further the advantage that the apparatus remains economical, since pure areas with high classes of purity are very cost intensive.

The present invention is further directed to a method for forming plastic preforms into plastic containers, whereby the plastic preforms are transported by means of a transport means. This transport means comprises a movable and in particular rotatable carrier which has a plurality of forming stations which have a cavity. The plastic preforms are formed into plastic containers within the cavity of the forming stations by applying a flowable medium to the plastic preforms and expanding them. Furthermore, the forming stations have (at least) one application means each, whereby the plastic preforms are acted upon by the flowable medium. The flowable medium is fed to the application means by at least one connecting line.

In accordance with the invention, at least one section of these connecting lines is at least twice exposed to a sterilization medium of a sterilization device.

Another advantageous method is to close a flow path at least temporarily during sterilization. Here, for example, an application means can be closed by means of a closing element so that the flow path is closed during sterilization. This closing element can be swiveled in as described above and can be designed as a sealing cap, for example. Thus it is possible that, for example, a stretching rod is first inserted into the application means, then a closing element closes the application means and then, for example, a sterilization process is carried out, whereby the supply lines, the stretching rod and the application means are sterilized.

When such a sterilization is finished, the supplied sterilization medium can be discharged from the machine via the discharge channels described above. Especially preferred is a continuous supply and feeding.

The above-mentioned discharge lines can be coupled, for example, with a suction unit that discharges the previously supplied sterilization medium, for example, emission-free and thus discharges it from the machine.

The present invention offers various advantages over the applicant's internal prior art. The present invention provides a sterilizable blow moulding machine in which at least the part of the machine flows through the media which come into contact with the sterilized packaging material (especially the sterilized containers and/or plastic preforms). Thus, the internally known systems can be improved, as a higher sterilization or a risk of recontamination can be reduced or almost eliminated.

Further advantages and embodiments are shown in the attached drawings.

DETAILED DESCRIPTION OF THE INVENTION

Figure 1:
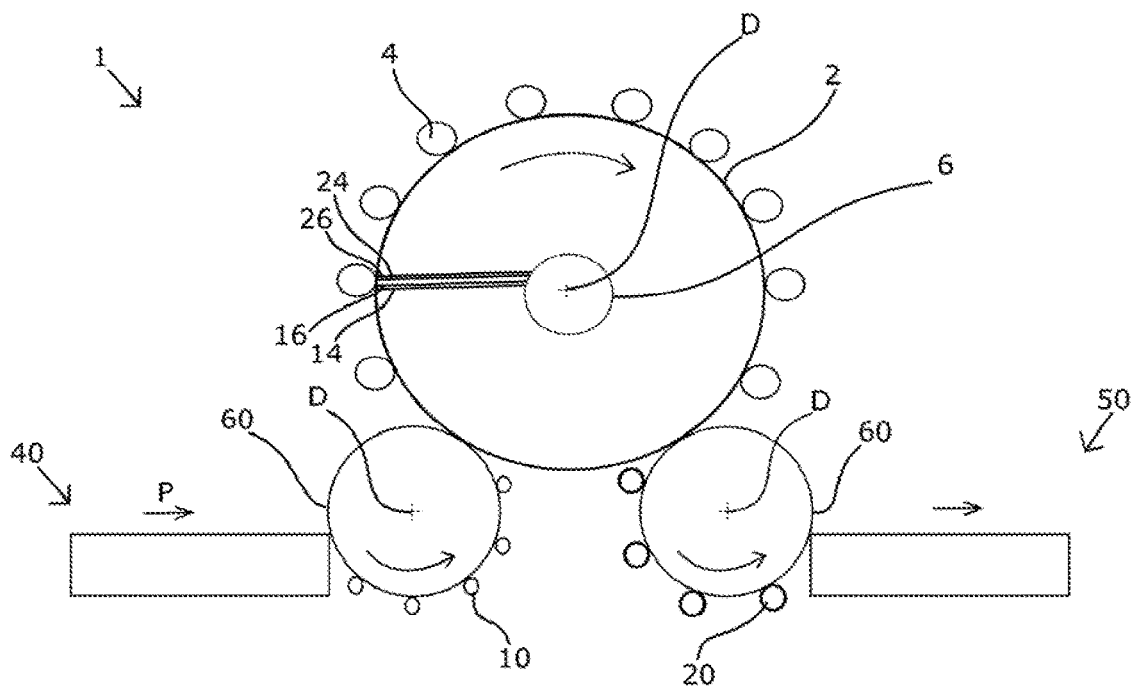
FIG. 1 is a rough schematic depiction of an apparatus according to the invention.

FIG. 1 shows an apparatus 1 according to the invention. It can be seen that a large number of forming stations 4 are arranged on a carrier 2. The reference sign D symbolizes the axis of rotation around which the carrier is movable or rotatable. The transport means 60 can also be seen, through which the plastic preforms 10 are fed to the carrier 2 or the forming stations 4 or through which the finished formed plastic containers 20 are received from the carrier 2 or the forming stations 4. These transport means 60 can also be rotated around the specified axis of rotation D.

The arrows indicate the transport direction P, which also indicates the transport path of the plastic preforms 10 and the plastic containers 20. FIG. 1 also shows that a heating means 40 is connected upstream of carrier 2 and that this heating means 40 is located upstream of carrier 2. In this depiction, a labeling and/or filling means 50 is located downstream of carrier 2 or this labeling and/or filling means 50 is located downstream of carrier 2.

In this depiction shown, a sterilization device 6 is arranged centrally on the carrier 2 and can, for example, rotate with it about the axis of rotation D. As mentioned above, it is also possible that each forming station 4 is assigned a sterilization device 6. Furthermore, the supply lines 14, 16 and the discharge lines 24, 26 can be seen, which are collectively referred to as connecting lines 28 (FIG. 3).

For reasons of clarity, only one pair of these supply and discharge lines 14, 16, 24 and 26 are shown in this diagram. Normally, all forming stations 4 are connected to the sterilization device 6 in this way. The forming stations 4 are also supplied with the blowing air or sterilization medium via the supply lines 14 and 16 as described above, through which the plastic preforms 10 are formed into the plastic containers 20, By means of the discharge lines 24 and 26, the used blowing air or the sterilization medium is discharged again from the forming station 4.

Figure 2:
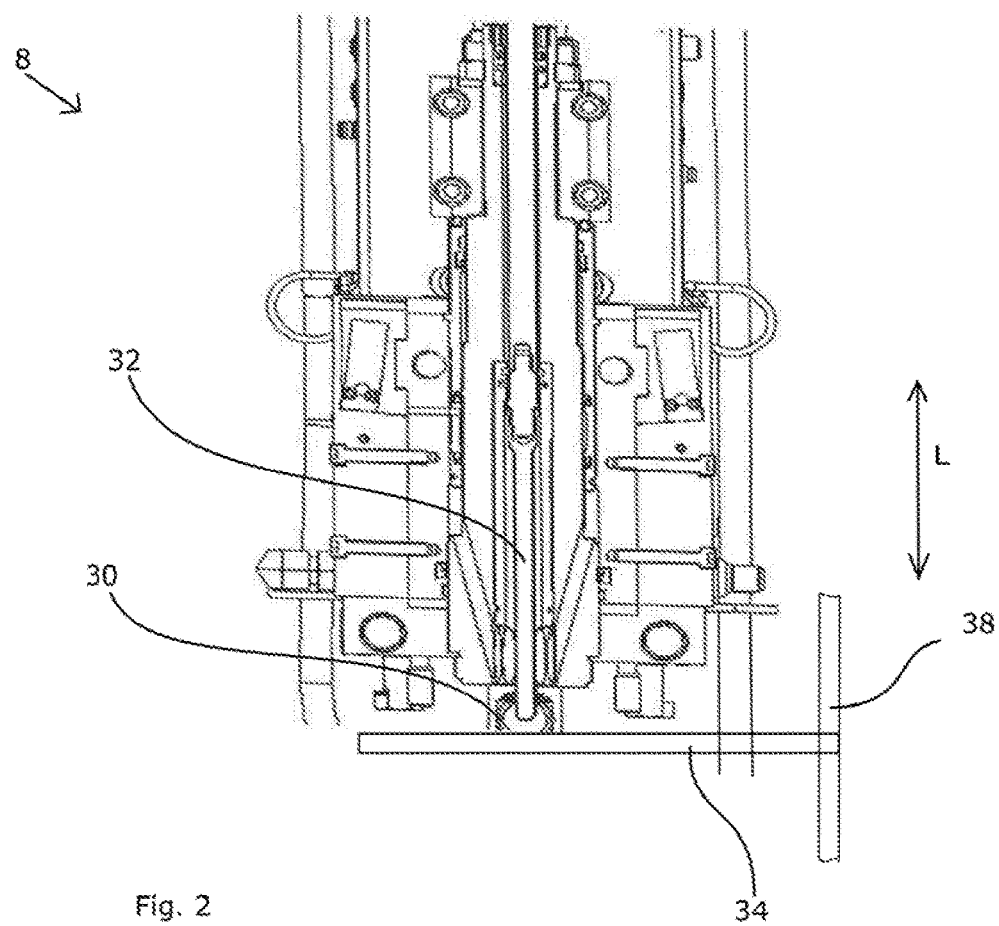
FIG. 2 is a more detailed depiction of a valve block.

FIG. 2 shows a more detailed depiction of a valve block 8, which is equipped with the application means 30, which is designed as a blow nozzle. Above this application means 30 is the stretching rod 32. This stretching rod 32 can be moved in longitudinal direction L. This means that the stretching rod 32 can be passed through the blow nozzle 30 and vice versa in order to stretch a plastic preform 10 in its longitudinal direction. Also shown is the closing means 38 with the movable or swivel-in closing element 34. Here, the closing element 34 is shown in such a position in which the application means 30 is completely closed, so that no flowable medium can escape from this application means 30, even if it is applied to this application means 30 with a predetermined pressure.

Figure 3:
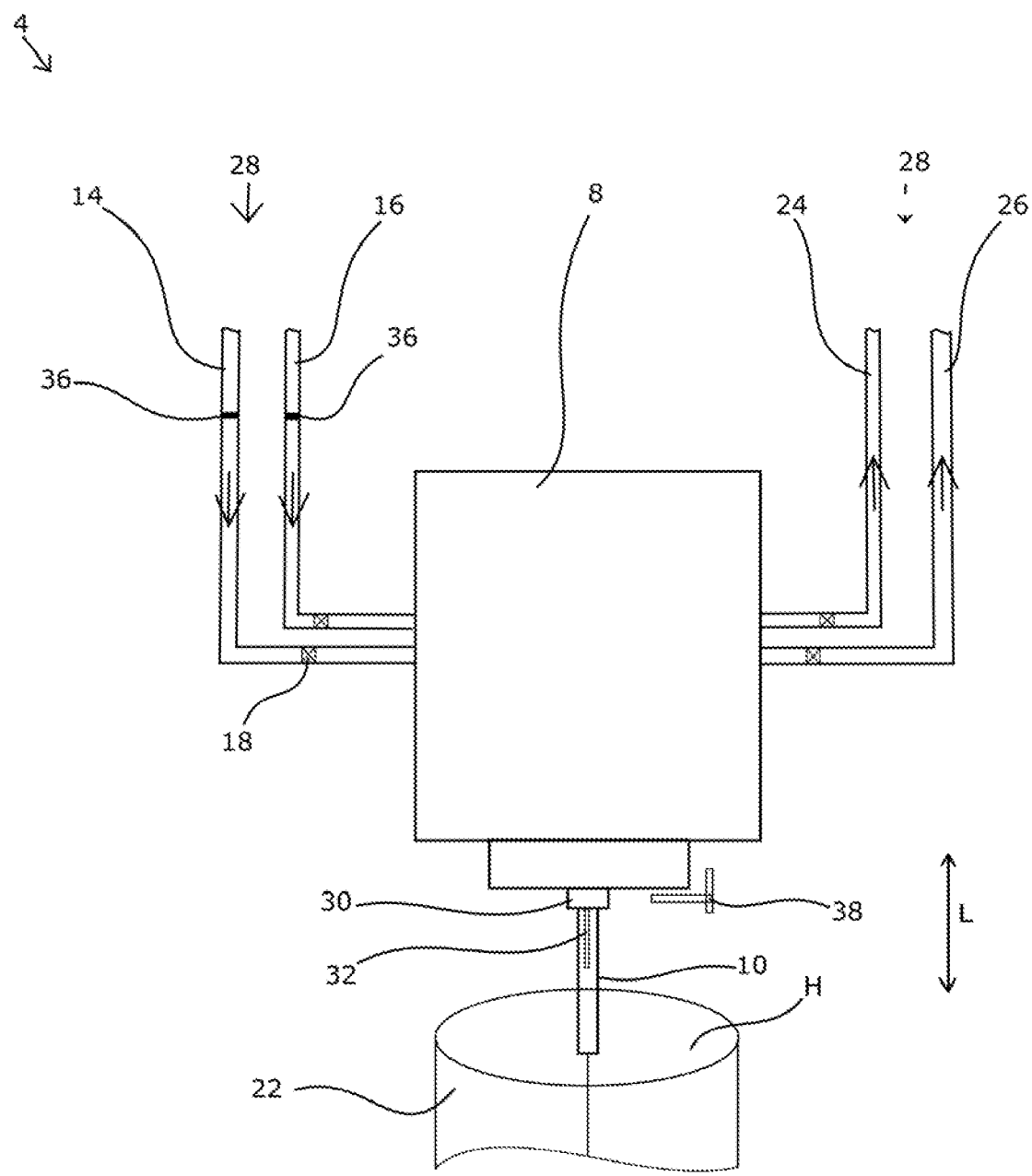
FIG. 3 is a rough schematic depiction of a forming station.

FIG. 3 shows a rough schematic depiction of a forming station 4, showing the valve block 8, which can be supplied with a sterilization medium or blown air via the supply lines 14 and 16. The valve block 8 also has two discharge lines 24 and 26. These discharge lines 24 and 26 can be used to discharge the used sterilization medium or the used blast air from the valve block 8. These supply lines 14 and 16 and discharge lines 24 and 26 are generally referred to as connecting lines 28.

Other uses of the respective lines would also be conceivable. For example, it would be conceivable that lines 14, 16 and 24 serve the supply and line 28 the discharge. It would also be conceivable that only line 14 serves the supply and lines 16, 24 and 28 the discharge.

Sterile filters 36 are arranged within the supply lines 14 and 16, through which the sterilization medium or the blow air can be passed. In addition, valves 18 are arranged in the supply lines 14 and 16 and also in the discharge lines 24 and 26. For a better overview only one valve is marked with the reference number 18. The arrows inside the supply lines 14 and 16 and the discharge lines 24 and 26 indicate the direction of flow of the sterilization medium or of the blast air inside the connecting lines 28.

The apparatus can also preferably have at least one (not shown) ring channel, which serves to provide a certain pressure level. Preferably the apparatus can have several ring channels, which provide different pressure levels.

In a preferred embodiment, the respective sterile filters are provided in front of the respective ring channels (in contrast to FIG. 3). As mentioned above, a separate sterile filter is provided for each pressure stage.

FIG. 3 also shows the application means 30, to which a plastic preform 10 is already attached. Inside the plastic preform 10, a stretching rod 32 can be seen, which can be moved in longitudinal direction L and thus stretches the plastic preform 10 in its longitudinal direction. In order to be able to show the process shown here, blow mould 22 was lowered. Normally, the plastic preform 10 is located inside the cavity H as mentioned above, in which the plastic preforms 10 are formed into plastic containers 20.

The stroke on the blow mould 22 is intended to illustrate that the blow mould 22 is, for example, composed of two parts, which, as described above, makes it possible for an opening and closing movement to take place, allowing a plastic preform 10 to be picked up and a plastic container 20 to be dispensed. In addition, the blow mould can also have a bottom part, so that the blow mould 22, for example, is composed of three parts. However, a corresponding bottom part is not shown in this figure. Since a blowing process is shown here, the closing means 38 is in a retracted position, whereby the application means 30 can charge the plastic preform 10 with blow air.

The applicant reserves the right to claim all features disclosed in the application documents as essential to the invention, provided they are novel individually or in combination with respect to the prior art. It is further pointed out that in the individual figures there are features described which per se can be advantageous. The person skilled in the art directly acknowledges that a certain feature described in a figure can also be advantageous without including further features from this figure. Further, the person skilled in the art acknowledges that advantages can also emerge through a combination of features shown in several, individual or different figures.

Furthermore, it is pointed out that such features, which have been described with regard to the apparatus and which have a certain suitability, are also used in the appropriate manner for the corresponding method.

LIST OF REFERENCE SIGNS 1 apparatus
2 carrier
4 forming station
6 sterilization device
8 valve block
10 plastic preforms
14 supply line
16 supply line
18 valve
20 plastic containers
22 blow mould
24 discharge line
26 discharge line
28 connecting lines
30 application means
32 stretching rod
34 closing element
36 sterile filter
38 closing means
40 heating means
50 labelling means/filling means
60 transport means
D rotary axis, axis of rotation
H cavity
L longitudinal direction
P transport direction

The invention claimed is:

1. An apparatus for forming plastic preforms into plastic containers, wherein the apparatus has a transport device for transporting the plastic preforms, wherein the transport device has a movable carrier on which a plurality of forming stations are arranged, wherein the forming stations each form a cavity and comprise forming moulds which are configured to receive plastic preforms which are formable into plastic containers within the cavity of the forming station, in that the plastic preforms are acted upon by a flowable medium and expanded, wherein the forming stations further comprise an flow applicator configured to act upon the plastic preforms with the flowable medium, and at least one connecting line, which is configured to guide the flowable medium to the flow applicator, and wherein the apparatus further has a sterilization device, whereby at least a section of this connecting line can be at least temporarily pressurized with a sterilization medium, wherein
the forming station has a closing device configured for closing the flow applicator, wherein the closing device has a movable and pivotable closing element configured to close the flow applicator during a sterilization process,
the closing element is configured to seal the flow applicator in such a way that a sterilization medium cannot escape from the flow applicator and does not get into the plastic preforms or into other areas of the apparatus, the apparatus has sterile filters in each supply line, wherein to sterilize the sterile filters, blow air paths, the flow applicator and a stretching rod, the sterilization medium is fed via the supply line to the flow applicator, and two supply lines for supplying the sterilization medium and two discharge lines for discharging the sterilization medium are assigned to or arranged at each forming station.

2. The apparatus according to claim 1, wherein the sterilization device has at least one first supply line configured for supplying the sterilization medium to the individual regions of the apparatus or the forming stations and/or the sterilization device has at least one first discharge line configured for discharging the sterilization medium from the individual regions of the apparatus or the forming stations.

3. The apparatus according to claim 1, wherein the sterilization device comprises at least one supply line configured for supplying the sterilization medium and at least one discharge line configured for discharging the sterilization medium.

4. The apparatus according to claim 1, wherein the connecting lines, the flow applicator, the stretching rod and the sterile filters are configured that they can be pressurized with an $H_2O_2$ gas and/or peracetic acid gas during their sterilization.

5. The apparatus according to claim 1, wherein the apparatus is arranged within a clean room.

6. A method for forming plastic preforms into plastic containers, wherein the plastic preforms are transported by a transport device, wherein the transport device has a movable carrier which has a plurality of forming stations which have a cavity in which the plastic preforms are formed into plastic containers by subjecting the plastic preforms to the action of a flowable medium and expanding them, wherein the forming stations further comprise an flow applicator, whereby the plastic preforms are acted upon by the flowable medium, wherein the flowable medium is guided to the flow applicator by at least one connecting line, and wherein at least one section of these connecting lines is at least temporarily acted upon by a sterilization medium of the sterilizing device, wherein the forming station has a closing device configured for closing the flow applicator, wherein the closing device has a movable and pivotable closing element configured to close the flow applicator during a sterilization process, the closing element is configured to seal the flow applicator in such a way that a sterilization medium cannot escape from the flow applicator and does not get into the plastic preforms or into other areas of an apparatus for forming plastic preforms into plastic containers, sterile filters are provided in each supply line, wherein to sterilize the sterile filters, blow air paths, the flow applicator and a stretching rod, the sterilization medium is fed via the supply line to the flow applicator, and two supply lines for supplying the sterilization medium and two discharge lines for discharging the sterilization medium are assigned to or arranged at each forming station.

7. The apparatus according to claim 1, wherein only the connecting lines which are configured to stretch the plastic preforms in the longitudinal direction are configured to be loaded with the sterilization medium.

* * * * *